United States Patent

Robinson et al.

[15] 3,662,189

[45] May 9, 1972

[54] TRIGGERABLE PULSE GENERATORS

[72] Inventors: Trevor Howard Robinson, Boreham; Alan William Cameron; Philip Jonn Fitz, both of Chelmsford, all of England

[73] Assignee: The Marconi Company Limited, London, England

[22] Filed: Dec. 11, 1970

[21] Appl. No.: 97,066

[52] U.S. Cl. ..............................307/252 L, 307/202, 328/67

[51] Int. Cl. ........................................................H03k 17/00

[58] Field of Search ..............307/202, 252 L, 252 Q; 328/67

[56] References Cited

UNITED STATES PATENTS 3,386,027 5/1968 Kilgore et al. ......................307/252 L 3,508,135 4/1970 Dijkstra et al. ......................307/252 Q 3,532,901 10/1970 Hylten-Cavallus et al. .........307/252 L

*Primary Examiner*—John Zazworsky

*Attorney*—Baldwin, Wight & Brown

[57] ABSTRACT

A triggerable pulse generator of the type having a series sequence of triggerable switches, that require priming, fed via a saturable inductance, a pulse forming network and a charging circuit to which D.C. voltage is applied has connected in shunt across each of the triggerable switches a damped series resonant circuit. The damped series resonant circuit is so dimensioned as to provide, for the switch with which it is in shunt the required correct priming current pulse for that switch.

3 Claims, 3 Drawing Figures

Inventors:
Trevor Howard Robinson
Alan William Cameron
and
Philip John Fitz
BY Baldwin Wight & Brown ATTORNEYS Inventors:
Trevor Howard Robinson
Alan William Cameron
and
Philip John Fitz
BY Baldwin Wight & Brown ATTORNEYS

TRIGGERABLE PULSE GENERATORS

This invention relates to triggerable pulse generators suitable for use for pulse modulating very high frequency oscillators or amplifiers such, for example, as magnetron oscillators and Klystron amplifiers which are required to produce — for example for pulse modulated high frequency communication — output pulses in response to input trigger pulses. More specifically the invention relates to high voltage triggerable pulse generators of the kind in which high voltage D.C. is applied to a charging circuit followed by a pulse forming network which feeds into a circuit including a series of voltage triggerable electronic switches which require so-called priming and which are intended to be triggered together.

The invention is illustrated in and explained in connection with the accompanying drawings in which FIG. 1, which is provided for purposes of introductory explanation, shows a known high voltage triggerable pulse generator of the kind to which the invention relates;

Figure 1:
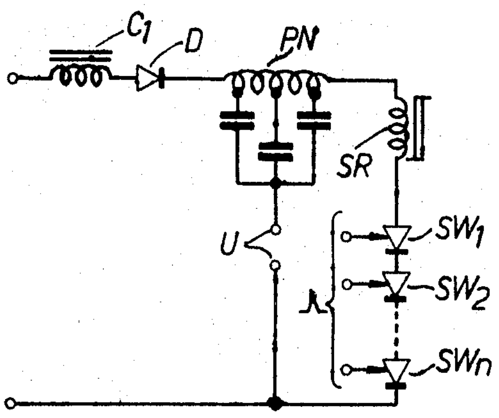
FIG. 1. PRIOR ART

Referring to FIG. 1 high voltage D.C., obtained for example from a 400 volt or other available relatively low voltage A.C. supply by transforming this voltage up and then rectifying and smoothing it, is applied to a charging circuit shown as a charging inductance C1 which is connected to a pulse forming network PN through an isolator shown as a diode D though it could take other forms such as a thyristor or a saturable inductance. The pulse forming network is of known kind and shown as consisting in effect of a series inductance and distributed shunt capacitance represented in FIG. 1 by three capacitors connected to three different points along the inductance. The far end of this inductance is connected through means (which will be ignored for the moment) to a series of voltage triggerable simultaneously triggered electron switches SW1, SW2 . . . . . . $SW_n$ which are triggered together by modulating pulses applied to them e.g. from the secondaries of a multi-secondary transformer (not shown) to the primary of which the modulating pulses are applied. The load, which might be, for example, the cathode-anode voltage supply circuit of a very high frequency magnetron oscillator or the cathode-collector voltage supply circuit of a very high frequency Klystron amplifier, is connected to the load terminals U. When modulating pulses are applied to the switches SW1 to $SW_n$ high voltage pulses appear at U — these could be, in practice, of the order of 3kV — and corresponding pulses of very high frequency oscillations - typically of the order of hundreds of Mc/s — appear from the oscillator or amplifier to which are applied the pulses at U suitably transformed by means not shown to a higher voltage commonly of the order of 30 to 50kV.

The switches SW1 to $SW_n$ are usually of a type which required priming — and it is to high voltage triggerable pulse generators employing this type of switch that the present invention relates — triggerable thyristors being, as indicated in FIG. 1, commonly employed as the switches. FIG. 1 shows a well known way of effecting this priming. Between the pulse forming network PN and the thyristors is inserted a delaying device usually constituted as shown by a saturable reactor SR consisting of an inductance having a core with a substantially rectangular hysteresis loop. In operation the reactor SR holds off the voltage on the pulse forming network PN for a short time during which a small magnetizing current — this is the priming circuit — flows through the thyristors. This small current through the thyristors permits the current carrying areas of the semi-conductor material thereof to spread and when sufficiently large areas are present the reactor becomes saturated and the much larger current discharge from the storage capacitance incorporated in the network PN passes into the load connected between the terminals U.

It is usual to provide means for stabilizing the generated pulses — such means could comprise a coil coupled to C1 and having in its circuit a triggerable electronic switch (e.g. another triggerable thyristor) which is automatically triggered to the conductive state when the voltage at the network PN rises above a pre-determined reference voltage — but, because such stabilizing means form per se no part of this invention they will not be further described or mentioned herein.

Figure 2:
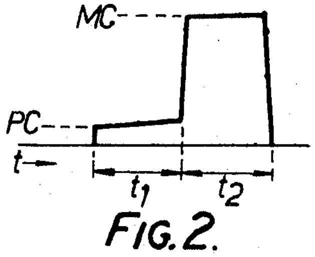
FIG. 2 is a graphical figure related to the operation of FIG. 1.

FIG. 2 shows the operation of FIG. 1 so far as the provision of the priming current is concerned. FIG. 2 is a curve of current (ordinates) against time $t$. During the delay period $t_1$ provided by the reactor SR the priming current PC flows. When the reactor saturates i.e., during the succeeding period $t_2$ the main pulse MC flows from the network PN.

This method of obtaining priming current, while having the advantage that no additional external source of priming current is required so that there is a minimum of circuit complication, has the defect that, because the priming current is obtained by an initial draining off of current from the main storage reservoir (the capacitance incorporated in the network PN) there is substantial loss of energy from said reservoir and, moreover, the shape of the main pulse is undesirably affected. It has also the other important defect that because in practice the thyristors, even though of the same types and ratings, will not in practice be exactly alike but will differ, sometimes quite substantially, inter se, correct dynamic sharing of voltage between them (as is, of course, desirable) will not occur and they may not trigger in exact simultaneity. The present invention seeks to provide simple arrangements in which these defects are overcome and pulse switch priming obtained, for each switch, with a current pulse the amplitude and length of which can be selected or adjusted to suit the characteristics of that switch.

According to this invention a triggerable pulse generator of the kind wherein a series sequence of voltage triggerable electronic switches requiring priming are fed through a pulse delay device from a pulse forming network preceded by a charging circuit to which D.C. voltage is applied comprises, across each of said switches, a shunt circuit including a pulse forming network in the form of an inductance with distributed capacitance along its length in series with a resistance of value similar to that of characteristic impedance of the last mentioned pulse forming network and, across the series combination of said last mentioned pulse forming network and last mentioned resistance, a further resistance, said last mentioned pulse forming network being adapted to provide the correct required priming current for said switch during a time substantially equal to the delay of said pulse delay device and the further resistance maintaining D.C. voltage distribution along the switch chain.

According to the invention described in the foregoing paragraph a diode is connected in shunt across each of the resistances which are in series with the last mentioned pulse forming networks and each of the last mentioned pulse forming networks are adapted to provide priming current during a time substantially equal to the sum of the delay time of said pulse delay device and the duration of the main pulse from said first mentioned pulse forming network.

Preferably the pulse delay device is a saturable inductance having a core with a substantially rectangular hysteresis loop.

Preferably the switches are triggerable thyristors.

Figure 3:
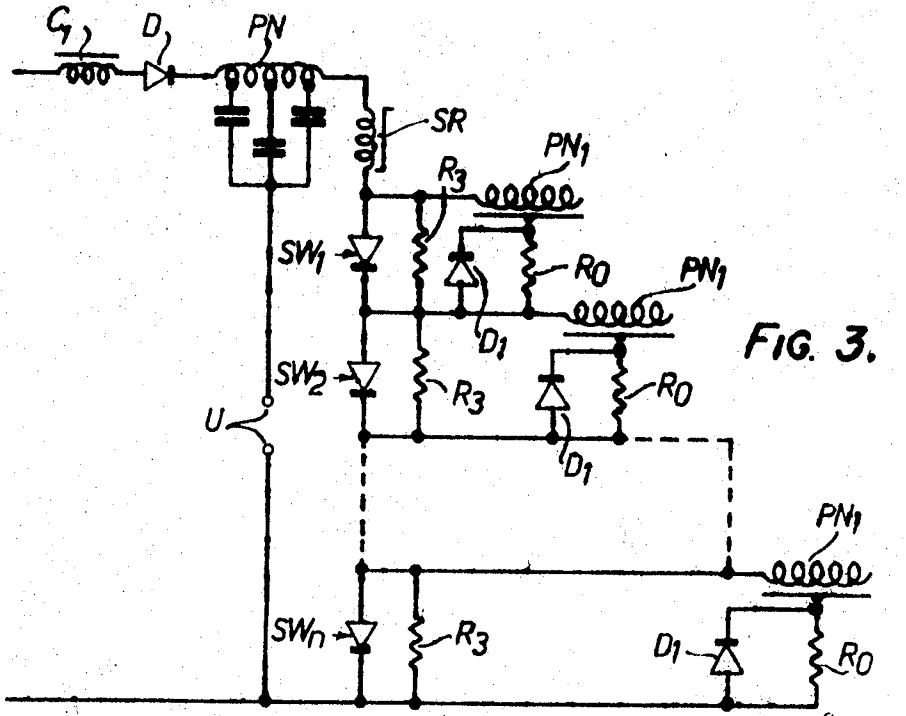
FIG. 3 illustrates the invention.

Referring to FIG. 3 each of the thyristors SW1 to $SW_n$ is shunted by an identical circuit comprising a pulse forming network $PN_1$ in the form of an inductance with distributed capacitance along its length, in series with a resistance $R_o$ of the same value as the characteristic impedance of the pulse forming network. A resistance $R_3$ is connected across the end of the pulse forming network adjacent the thyristor. Priming current of the desired amplitude and of a duration equal to the delay time of the saturable reactor $SR_1$ is provided by the pulse forming network $PN_1$. In this case the priming current PC will be rectangular in shape similar to that shown in FIG. 2. Correct dynamic voltage sharing is provided by the pulse forming network capacitance of $PN_1$ which swamps the self-capacitance of the thyristor and D.C. voltage distribution is maintained by $R_3$.

A diode $D_1$ is connected across the resistance $R_o$. This assists recovery of the thyristors. The duration of the priming pulse (determined by $PN_1$) is made equal to the sum of the saturation time of the saturable reactor SR and the main pulse, i.e. $t_1+t_2$ in FIG. 2. Since $R_o$ is shorted out by the diode $D_1$ during the priming pulse, the amplitude of the priming pulse is limited only by the characteristic impedance of the pulse forming network $PN_1$. In addition, at the end of the priming pulse, the pulse forming network $PN_1$ reverses polarity thus assisting the extraction of hole charge from the thyristor. To this reversed pulse forming network polarity, the diode $D_1$ now presents an open circuit and the matching resistor $R_o$ prevents any further polarity reversal of the pulse forming network $PN_1$.

We claim:

1. A triggerable pulse generator of the type including a D.C. voltage charging circuit, and a pulse forming network including a pulse delay device and a series of voltage triggerable electronic switches connected to said charging circuit, said switches being of the type which require priming, the improvement comprising:

a shunt circuit across each of said switches, each shunt circuit including a pulse forming network in the form of an inductance with distributed capacitance along its length, a first resistance in series with the last-mentioned pulse forming network and having a value similar to that of the characteristic impedance of said last-mentioned pulse forming network, a further resistance across the series combination of said last-mentioned pulse forming network and said first resistance, and a diode connected in shunt across said first resistance, said last-mentioned pulse forming network being adapted to provide priming current for its associated voltage triggerable electronic switch during a time substantially equal to the sum of the delay time of said pulse delay device and the duration of the main pulse from the first-mentioned pulse forming network and said diode being poled to assist recovery of said associated voltage triggerable electronic switch.

2. A triggerable pulse generator as claimed in claim 1 and wherein the pulse delay device is a saturable inductance having a core with a substantially rectangular hysteresis loop.

3. A triggerable pulse generator as claimed in claim 1 and wherein the switches are triggerable thyristors.

* * * * *